(12) United States Patent
Ueki et al.

(10) Patent No.: US 6,824,595 B2
(45) Date of Patent: Nov. 30, 2004

(54) GAS ADSORPTION FILTER

(75) Inventors: Takuya Ueki, Okayama (JP); Yutaka Sasaki, Okayama (JP); Hirofumi Morimoto, Okayama-ken (JP)

(73) Assignee: Japan Gore-Tex Inc., Tokyo (JP)

( * ) Notice: Subject to any disclaimer, the term of this patent is extended or adjusted under 35 U.S.C. 154(b) by 0 days.

(21) Appl. No.: 10/251,655

(22) Filed: Sep. 20, 2002

(65) Prior Publication Data

US 2003/0056653 A1 Mar. 27, 2003

(30) Foreign Application Priority Data

Sep. 26, 2001 (JP) .................................. 2001-295003

(51) Int. Cl.⁷ .............................................. B01D 53/04
(52) U.S. Cl. ......................... 96/134; 96/154; 55/385.6; 360/97.02
(58) Field of Search ..................... 96/134, 135, 139, 96/147, 152, 154; 55/385.1, 385.4, 385.6; 360/97.02, 97.03, 97.04

(56) References Cited

U.S. PATENT DOCUMENTS

| | | | | |
|---|---|---|---|---|
| 3,962,153 A | | 6/1976 | Gore ........................ 260/2.5 R |
| 5,447,695 A | * | 9/1995 | Brown et al. ................ 422/171 |
| 5,593,482 A | * | 1/1997 | Dauber et al. ............. 96/117.5 |
| 5,733,271 A | * | 3/1998 | Bjorn ......................... 604/333 |
| 5,997,614 A | * | 12/1999 | Tuma et al. ...................... 96/4 |
| 6,144,522 A | * | 11/2000 | Myokan et al. .......... 360/97.02 |
| 6,214,070 B1 | * | 4/2001 | Crowder et al. .............. 55/320 |
| 6,214,095 B1 | | 4/2001 | Logan et al. ................. 96/147 |
| 6,475,269 B1 | * | 11/2002 | Turner ......................... 96/134 |
| 6,475,270 B1 | * | 11/2002 | Graeve ......................... 96/135 |
| 6,643,093 B2 | * | 11/2003 | Brown et al. ............ 360/97.02 |
| 6,712,887 B2 | * | 3/2004 | Ueki et al. ..................... 96/134 |
| 2003/0218829 A1 | * | 11/2003 | Hong et al. ............. 360/97.02 |
| 2003/0227711 A1 | * | 12/2003 | Macpherson ............ 360/97.02 |

FOREIGN PATENT DOCUMENTS

| | | |
|---|---|---|
| JP | 46-7284 | 12/1971 |
| JP | 50-22881 | 3/1975 |
| JP | 3-504876 | 10/1991 |
| JP | 4-323007 | 11/1992 |
| JP | 2000-70649 | 3/2000 |
| WO | WO 90/08801 | 8/1990 |

* cited by examiner

Primary Examiner—Frank M. Lawrence
(74) Attorney, Agent, or Firm—Richard W. Ellis

(57) ABSTRACT

To provide a mounting structure for a gas adsorption filter and a housing equipped with the gas adsorption filter that make it possible to overcome the contradiction between achieving a further reduction in the size of airtight containers such as casings for magnetic storage disk devices, and ensuring improved control over moisture, noxious gases, and other types of contaminants in the airtight containers. A mounting structure for a gas adsorption filter to be mounted in an airtight container, wherein the gas adsorption filter 11a is obtained by providing an adsorbent 13 to one or both sides of a base 12, covering the adsorbent 13 with a breathable member 14 to form an adsorbent unit, bonding together the breathable member 14 and the peripheral portion of the adsorbent 13 on the base 12 to form a collar 15, fitting the adsorbent unit of the gas adsorption filter 11a into a mounting hole formed in the airtight container, and bonding the collar 15 of the gas adsorption filter 11a to the peripheral portion of the mounting hole outside the airtight container.

17 Claims, 5 Drawing Sheets

[Figure 1]
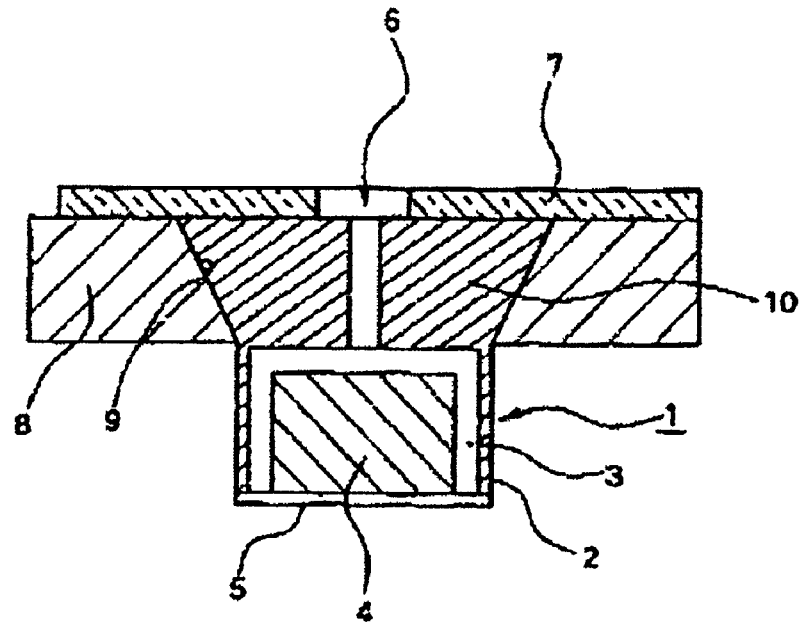
PRIOR ART
[Figure 2]
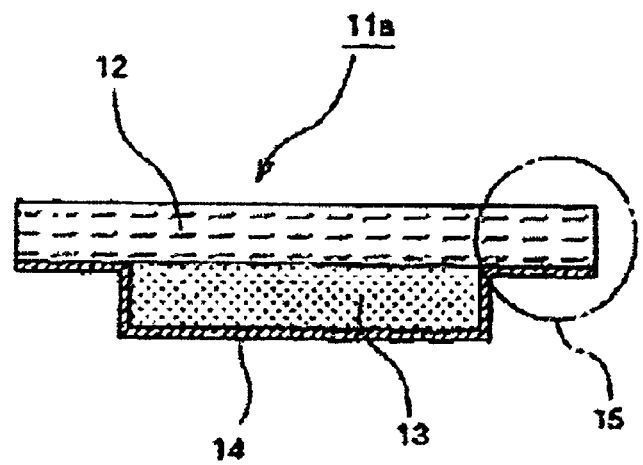

[Figure 3]
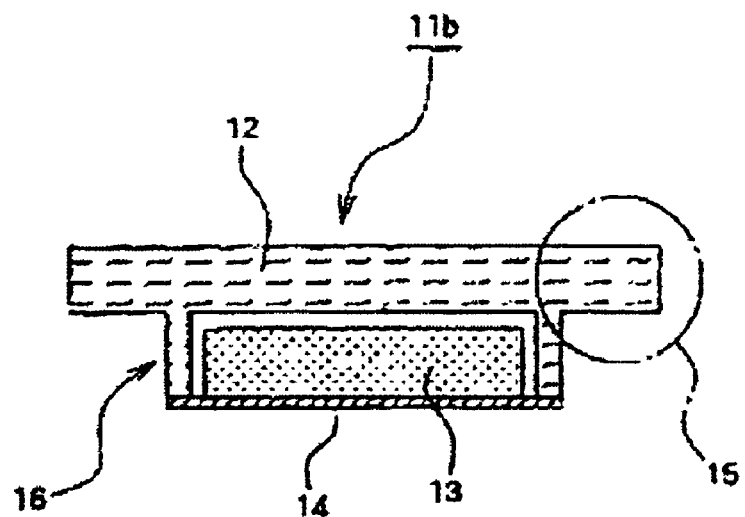
[Figure 4]
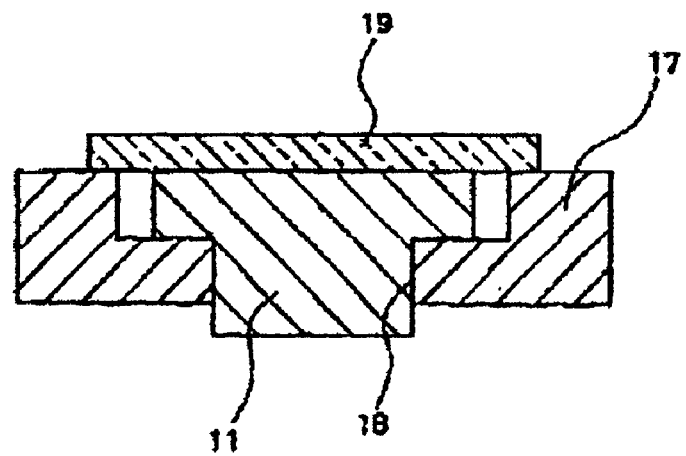

[Figure 5]
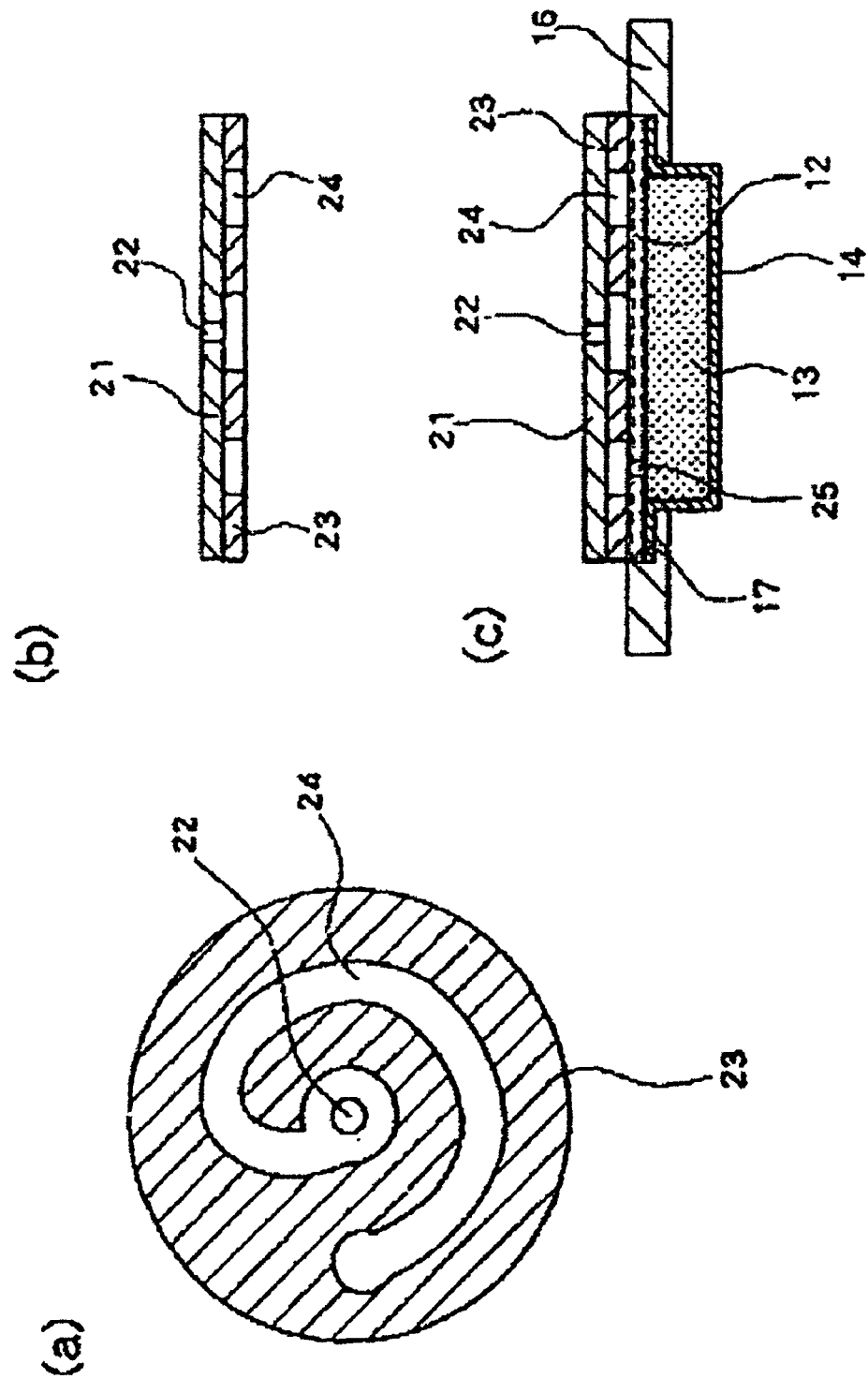

[Figure 6]
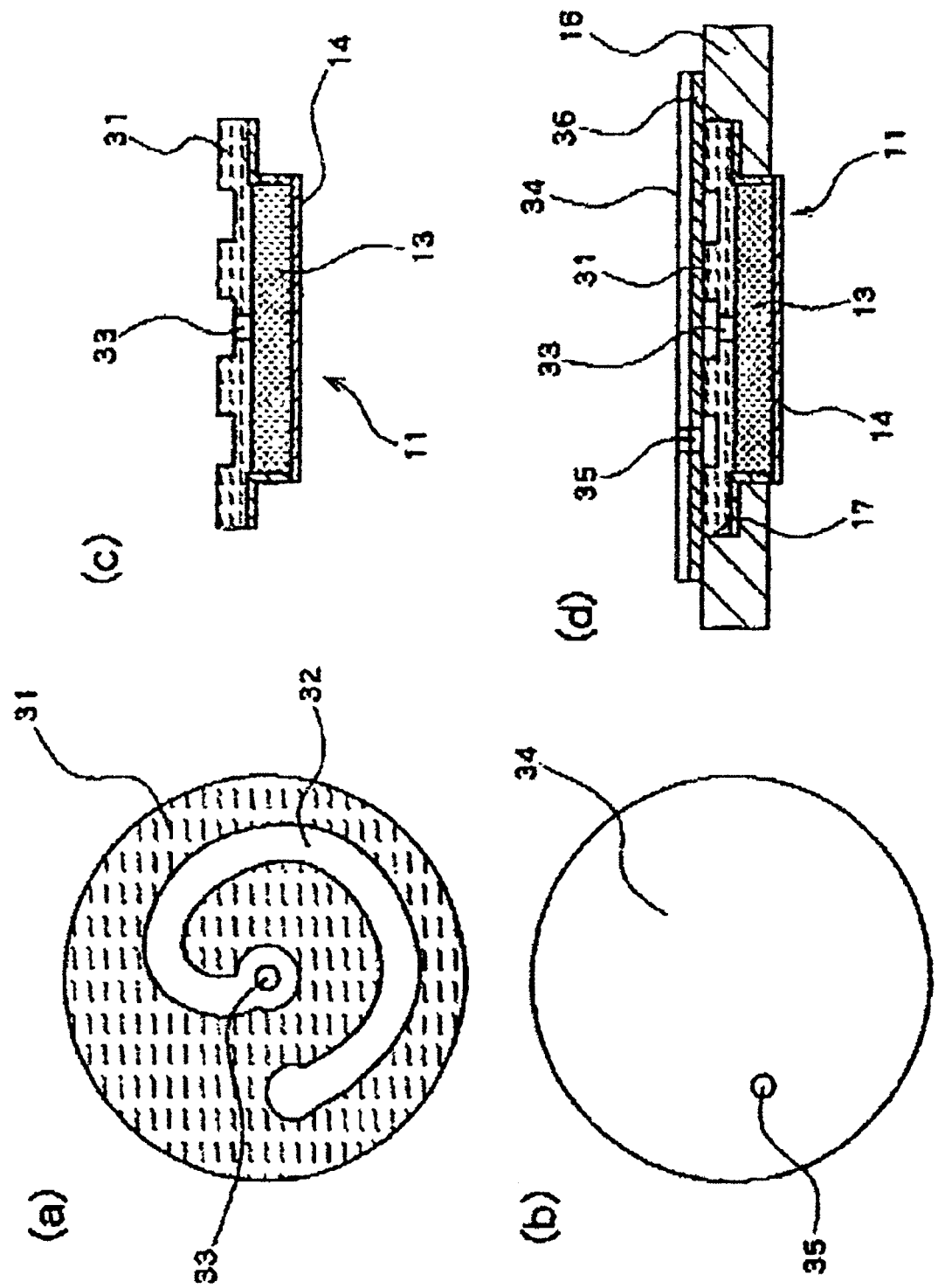

[Figure 7]
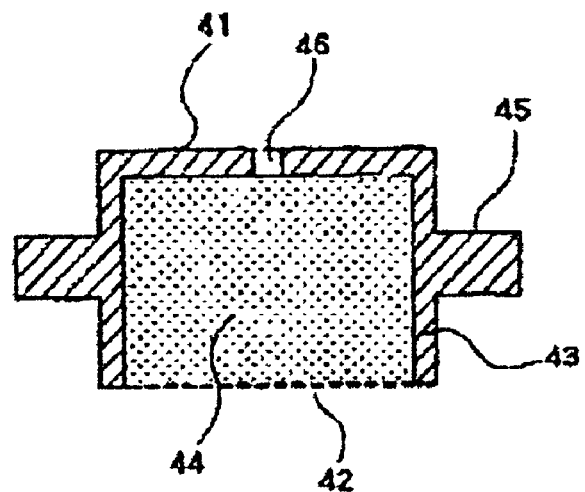
[Figure 8]
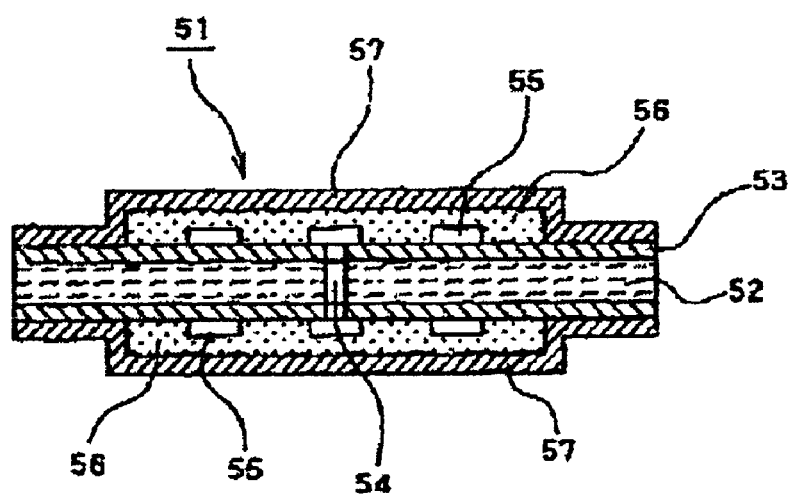

GAS ADSORPTION FILTER

BACKGROUND OF THE INVENTION

1. Field of the Invention

The present invention relates to a mounting structure for a gas adsorption filter and to a housing equipped with a gas adsorption filter, and more particularly to a mounting structure for a gas adsorption filter and to a housing equipped with a gas adsorption filter in which an airtight container that needs to be protected from contamination by dust, corrosive gas, humidity, or the like is designed such that much less space is needed to accommodate the essential functional components disposed in the interior, and the contaminants can be adsorbed and removed with exceptional efficiency.

2. Description of Related Art

Magnetic storage disk devices such as computer hard drives (also referred to herein below as "HDDs") are extremely sensitive to chemical contamination. High-molecular-weight organic vapors are adsorbed on the extremely smooth surfaces of disks, impeding the read performance of the head and causing head crashes. Other types of chemical contaminants (for example, $SO_2$) sometimes bring about metallurgical changes in disks and magnetic heads, and particularly corrosion in magnetic-resistance read elements. In conventional practice, HDDs are fashioned as completely sealed structures in order to prevent such corrosive gases from penetrating from the outside. Recently, however, a transition has been made to manufacturing top covers from press-formed stainless steel plates, but since strain is generated in completely sealed containers due to volume variations induced by temperature changes causing head crashes, case deformations, and other problems, methods in which ventilation ports are provided to adjust the pressure inside the container have been widely adopted. Gas adsorption filters obtained by integrating gas adsorbents and particle filters are also used on a wide scale in order to prevent microparticles and corrosive gases from penetrating through the ventilation ports from the outside. Such gas adsorption filters are designed such that the ventilation ports are completely covered with an activated carbon sheet or the like, and any noxious gas that has seeped in is removed by being passed through a gas adsorbent layer.

The storage capacity of HDDs has increased dramatically in recent years. The storage capacity of an HDD with a single media (3.5-inch disk) currently reaches 40 GB and is projected to reach 100 GB in the near future. Even as the storage capacity of HDDs keeps increasing, their prices remain on the same level, confronting HDD manufacturers with the important task of seeking out ways to remain profitable. At the same time, HDD miniaturization continues with the popularization of notebook computers, PDAs, and other mobile computers. The race for HDD miniaturization has recently intensified due to increased storage capacity, lower prices, a push by the manufacturers to expand into new markets, and other trends. An HDD with a 1-inch disk was developed and put on the market last year by IBM, as was an HDD with a 1.8-inch disk by Toshiba. Even HDD manufacturers who until now did not have HDDs with 2.5-inch disks in their product lineup are starting to develop HDDs with 2.5- and 1.8-inch disks. It appears certain that large numbers of HDD manufacturers are going to be involved in the manufacture and distribution of HDDs with disks that measure 2.5 inches or less.

To create miniature HDDs with disks that measure 2.5 inches or less, it is necessary to pack a large number of components into small containers, so securing the necessary space is a significant challenge. This is because the advantages of a miniature HDD include ease of handling, small size, and light weight, and devices are currently being designed with the objective of achieving minimum excess space and maximum compactness. There is, therefore, a strong need for component miniaturization.

Such miniature HDDs are primarily used in notebook computers, PDAs, and other applications in which portability is an important feature. Such devices are often operated in environments in which, for example, a device is carried around in the summer and is brought into an air-conditioned room after being exposed to high temperature and humidity, whereupon moisture condenses inside the HDD as a result of a rapid drop in temperature. Situations can also be envisaged in which such products are used at construction sites, at locations in which exhaust gas (SOx, NOx, organic gases) or the like is present, and in other environments with high concentrations of noxious gases or particles harmful to HDDs. Specifically, miniature HDDs can be exposed to the rigorous environments not encountered by desktop computers, making contamination control (particle collection, humidity adjustment by the release and absorption of moisture, adsorption and removal of noxious gas) a critical issue in terms of preserving vital functions. For this reason, miniature HDDs require smaller components, and the gas adsorption filters used to control contamination must at the same time have greater adsorption capacity, be capable of rapid contaminant removal (have appropriate response properties), and possess other improved characteristics. Currently, however, a conflict There is substantially no space inside a miniature HDD, making it extremely difficult to install a gas adsorption filter capable of adequately adsorbing and removing corrosive gases or the like. With conventional techniques, it is extremely difficult to achieve a thickness of 0.6 mm or less, even in a minimal structure comprising an adhesive layer (which is used to affix the gas adsorption filter), a gas adsorbent layer, and a filter layer (which is used to prevent particle contamination), and any further reduction in film thickness brings about problems such as impaired handling during assembly, problems such as the failure to secure adequate adsorption performance due to reduced gas adsorbent capacity and the like.

An HDD rejected as a result of a pre-shipping inspection is retrieved, reworked (repaired and reassembled), re-inspected, and shipped. For this reason, each component needs to be washed, cleaned, and reused, and large numbers of components are actually used in this manner. The gas adsorption filters primarily used in current practice are mostly fixed in place with the aid of adhesives. Peeling off a gas adsorption filter for reworking purposes may deform the gas adsorption filter and allow part of the adhesive to remain on the adherend, creating problems not only in terms of reusing the gas adsorption filter but also in terms of reusing the adherend.

An HDD designed to allow gas adsorption filters to be reused has been marketed by IBM under the trade name of Ultrastar. FIG. 1 is a cross section depicting the mounting structure for a gas adsorption filter used in this type of HDD. In this mounting structure, the bottom of a plastic box 2 that forms the outside of a gas adsorption filter 1 is machined to form a convex portion 3, the gas adsorption filter 1 is dropped into a hole 9 formed in an HDD container 8 from outside the HDD, and the filter is fixedly sealed from the outside of the HDD by an adhesive tape 7. In the drawing, 4 is an adsorbent, 5 a breathable sheet, and 6 a ventilation port. This structure, however, is designed solely with the purpose of allowing the gas adsorption filter to be reused, and cannot be expected to be effective in terms of improved performance or reduced space. In practice, the sole difference of the gas adsorption filter used in IBM's Deskstar from the one shown in FIG. 1 is the absence of the component 10 shaped as a circular truncated cone and disposed in the ventilation port 6. In this filter, an adhesive is applied to the top of the convex portion 3, and this adhesive is affixed to the inner wall of the HDD. Thus, a structure such as the one shown in FIG. 1 is substantially ineffective in terms of reducing space or improving adhesion performance.

As described above, the inside space of miniature HDDs is gradually decreasing. Trace amounts of corrosive gases are generated by the adhesives, plastics, motors, and other components disposed inside the HDDs. Although miniature HDDs contain fewer components than do HDDs with 3.5-inch disks, the concentration of gases generated inside such HDDs tends to increase because the interior space is extremely small. A need therefore exists for reducing, even if only slightly, the amount of gases generated by the components inside an HDD.

Providing the bottom part of a filter with a nonadhesive, nonporous base layer is proposed in U.S. Pat. No. 6,214,095 as a means of addressing this problem. In this technique, however, pins or folders are needed to fix a gas adsorption filter in place inside a disk drive without the use of an adhesive. This approach is therefore disadvantageous in that extra parts required incur higher costs, and additional time is needed to perform the fixing operation.

Overcoming the deficiencies of these prior art devices, as well as other purposes of the present invention will become evident from review of the following specification.

SUMMARY OF THE INVENTION

The present invention, which was perfected in view of the above-described shortcomings of the prior art, is aimed at providing a mounting structure for a gas adsorption filter and a housing equipped with the gas adsorption filter that make it possible to overcome the contradiction between achieving a further reduction in the size of airtight containers such as casings for magnetic storage disk devices, and ensuring improved control over moisture, noxious gases, and other types of contaminants in the airtight containers.

Another object of the present invention is to provide a mounting structure for a gas adsorption filter and a housing equipped with a gas adsorption filter in which the pressure loss can be kept at the same or lower level in comparison with a conventional gas adsorption filter, and the gas adsorption features can be kept at the same or higher level than in the past without requiring any modifications to the casing configuration of airtight containers or requiring any of the cost-enhancing plastic parts to be installed.

The inventors perfected the present invention as a result of extensive research aimed at overcoming the aforementioned shortcomings.

Specifically, the present invention provides a mounting structure for a gas adsorption filter and a housing equipped with a gas adsorption filter, as described below. The gas adsorption filter to be mounted in an airtight container is formed by providing an adsorbent to one or both sides of a base, covering the adsorbent with a breathable member to form an adsorbent unit, bonding together the breathable member and the peripheral portion of the base around the adsorbent to form a collar, fitting the adsorbent unit of the gas adsorption filter into a mounting hole formed in the airtight container, and bonding the collar of the gas adsorption filter to the peripheral portion of the mounting hole outside the airtight container. The breathable member is preferably a porous polymer film, and more preferably a laminated sheet comprising a porous polymer film and a breathable support. In an alternative embodiment, the breathable member is an adsorbent container at least partially composed of a porous polymer film, more preferably at least partially composed of a laminated sheet of porous polymer film and a breathable support. In a preferred embodiment, the porous polymer film comprises porous polytetrafluoroethylene film.

In further embodiments, the mounting structure may comprise one or more optional features such as ventilation ports formed in the base, the collar bonded to the peripheral portion of the mounting hole outside the airtight container, the base and the external surface of the airtight container covered with a cover sheet, the external surface of the base provided with a release layer, and the adsorbent provided with grooved air channels. These features will be described in more detail herein.

In a further embodiment, the invention is directed to a mounting structure for a gas adsorption filter to be mounted in an airtight container, wherein the gas adsorption filter comprises an adsorbent container unit that contains an adsorbent and consists at least partially of a breathable sheet, a projection formed on part of the side surface of the adsorbent container unit, wherein the adsorbent container unit below the projection on the gas adsorption filter is fitted into a mounting hole formed in the airtight container, and the projection on the gas adsorption filter is bonded to the peripheral portion of the mounting hole on the outside of the airtight container.

The breathable sheet may comprise a porous polymer film, more preferably a laminated sheet of porous polymer film and a breathable support, and most preferably wherein the porous polymer film is a porous polytetrafluoroethylene film.

Further, a housing containing such devices is disclosed and claimed.

DESCRIPTION OF THE DRAWINGS

The operation of the present invention should become apparent from the following description when considered in conjunction with the accompanying drawings, in which:

FIG. 1 is a cross section depicting the mounting structure for a conventional prior art gas adsorption filter;

FIG. 2 is a cross section illustrating an example of the gas adsorption filter used in a first embodiment of the present invention;

FIG. 3 is a cross section illustrating another example of the gas adsorption filter used in a first embodiment of the present invention;

FIG. 4 is a cross section illustrating the mounting structure for a gas adsorption filter pertaining to a first embodiment of the present invention;

FIG. 5 is a diagram depicting an example in which a ventilation port and an air channel are provided;

FIG. 6 is a diagram depicting another example in which a ventilation port and an air channel are provided;

FIG. 7 is a cross section illustrating the structure of the gas adsorption filter used in an alternative embodiment of the present invention; and FIG. 8 is a cross section illustrating the structure of the gas adsorption filter used in a further alternative embodiment of the present invention.

DETAILED DESCRIPTION OF THE INVENTION

The present invention will now be described in detail.

A mounting structure for a gas adsorption filter pertaining to a first embodiment will first be described.

FIGS. 2 and 3 are cross sections schematically depicting structural examples of the gas adsorption filter (occasionally abbreviated herein below as a "gas adsorption filter") used in a first embodiment of the present invention, and FIG. 4 is a cross section depicting the manner in which this gas adsorption filter is mounted in an airtight container (in the present example, an HDD container). In the drawings, 11a and 11b (sometimes referred to collectively herein below as "11") designate gas adsorption filters, these gas adsorption filters 11a and 11b are mounted in an airtight container 17, an adsorbent 13 is provided on one side of a base 12, and the adsorbent 13 is covered by a breathable member 14 to form an adsorbent unit. In the gas adsorption filter 11a in FIG. 2, the breathable member 14 and the peripheral portion of the base 12 around the above-described are bonded together to form a collar 15. In the gas adsorption filter 11b in FIG. 3, the base 12 and an adsorbent container unit 16 are formed in integral fashion, and the bottom of the adsorbent container unit 16 is covered with the breathable member 14 to form an adsorbent unit. The adsorbent unit of the gas adsorption filter 11 is fitted into a mounting hole formed in the airtight container 17, and the collar 15 of the gas adsorption filter ills fitted from the outside into the mounting hole 18 of the airtight container 17. as shown in FIG. 4. In addition, the gas adsorption filter 11 is fixed in place by an adhesive tape 19.

The airtight container 17 designed for mounting the gas adsorption filter 11 is a container provided with the aim of protecting materials, components, devices, and the like from external shocks, dust, gases, other types of contaminants, and the like, and may be a completely sealed airtight container or a semi-sealed container provided with a ventilation port for reducing pressure variations. The following options can also be cited as further specific examples, but these options are nonlimiting.

(1) A housing for a storage device used in a computer. Examples of such storage devices include DVD, MO, HDD, and other devices in which information can be written and read using light; devices in which information can be written and read using magnetism; and devices that are combinations of these two types of devices. In devices in which information is written and read using light, the dust floating in the air may deposit on the lens surface, or gas may deposit and cause clouding, making it difficult to read or write information. HDDs and other magnetic disks, magnetic heads, or the like are highly susceptible to contamination with organic gas, corrosive gas, or the like, and are easily affected by particles because of a very small distance (several micrometers) between the head and the medium. Extremely stringent contamination control is needed for these types of devices. For this reason, aluminum die-cast cases and stainless steel covers are usually screwed together and sealed with the aid of packing when, for example, HDD housings (containers) are involved. The outer walls of such containers are commonly made thinner in order to reduce weight, and are embossed in order to ensure higher strength.

(2) Wafer cases for transporting semiconductor wafers, and media cases for transporting HDD media. Cases fabricated by injection molding from polypropylene resins, fluororesins, or the like are commonly used for this purpose.

(3) Cases for protecting computer units for controlling the fuel supply of an automobile.

(4) Housings provided for the purpose of preventing the entry of moisture in view of the fact that light-emitting elements deteriorate when liquid-crystal displays, plasma displays, organic light-emitting displays, or the like are affected by humidity.

(5) Containers for preventing drug deterioration, containers for supplements or the like.

A component obtained by forming a concavity by means of embossing or the like in the surface of the exterior wall section of a container should preferably be used for the airtight container 17. Forming a concavity in the surface of the airtight container 17 allows the base 12 of the gas adsorption filter 11 to fit into this concavity and prevents the gas adsorption filter 11 from extending beyond the airtight container 17 by providing the concavity with a mounting hole 18 and installing the gas adsorption filter 11 therein. Extending the gas adsorption filter 11 beyond the airtight container 17 widens the space occupied by the airtight container 17 in the device, increases the danger that the protruding portions of the gas adsorption filter 11 will come into contact with the other components of the device and cause damage to the gas adsorption filter 11, and creates other problems.

The material constituting the base 12 of the gas adsorption filter 11 is not subject to any particular limitations as long as this material is sufficiently strong to preserve its shape and is capable of forming the collar 15. Specific examples of such materials include polypropylene, polyester, and other plastic materials; stainless steel, aluminum, and other metal/alloy materials; and glass. The base 12 may be in the form of a plate, nonwoven fabric, woven fabric, knit fabric, plate with closed cells, porous film, mesh, net, or the like. The base 12 should preferably be obtained such that the adsorbent container unit 16 and the base 12 are integrated by the injection molding or cutting of a plastic material, die-casting or cutting of a metal material, or another method, as shown in FIG. 3. The base 12 can have any thickness that allows the collar to retain its shape, but a thinner collar is preferred because it allows a thinner gas adsorption filter 11 to be obtained. The thickness thereof should be 3 mm or less, preferably 1 mm or less, and ideally 500 $\mu$m or less. The approximate shape is commonly round, elliptical, or rectangular, but is not limited in any particular way.

The adsorbent 13 can be any material that has adsorption properties. Examples include physical adsorbents such as silica gel, activated carbon, activated alumina, molecular sieve, clay, and super-adsorbent fibers (used either singly or as combinations of two or more components selected therefrom); chemical adsorbents such as calcium carbonate, calcium oxide, barium oxide, calcium sulfate, potassium permanganate, sodium carbonate, potassium carbonate, sodium phosphate, and activated metals (used either singly or as combinations of two or more components selected therefrom); and physicochemical adsorbents obtained by combining certain types of physical and chemical adsorbents with other types of adsorbents. Among these adsorbents, it is particularly preferable to use the physical adsorbents activated carbon and silica gel (either singly or as combinations). Activated carbon has high adsorption capacity and can adsorb a large number of gas types. Silica gel has an excellent ability to adsorb and release moisture, and is thus suitable for applications in which moisture control functions are required. Using a combination of activated carbon and silica gel makes it possible to obtain an adsorbent that combines moisture control functions with an ability to adsorb noxious gases. The adsorbent 13 may be obtained by packing an adsorbent powder into an adsorbent-accommodating space. It is possible to use a product obtained by mixing and molding an adsorbent powder and a polytetrafluoroethylene resin (occasionally referred to herein below as a "adsorbent block") in the manner described in JP (Kokai) 4-323007. An adsorbent block in the form of a sheet is advantageous in the sense that it is easier to handle and process than a packed adsorbent powder. It is also possible to obtain a structure in which a thin porous expanded polytetrafluoroethylene film is laminated to both the front and back sides of an adsorbent block, as described in JP (Kokai) 2000-70649. The adsorbent block tends to produce dust because it contains an adsorbent powder, but laminating a thin porous expanded polytetrafluoroethylene film to the surface of the adsorbent block makes it possible to prevent such dust production, and is thus beneficial in the sense that the adsorbent block remains easy to handle until the gas adsorption filter is assembled. A molded article produced using a resin matrix and an adsorbent filler may also be appropriately used as a gas adsorbent sheet in accordance with the present invention.

The breathable member 14 is not subject to any particular limitations and can be any member capable of preventing the shedding of the adsorbent 13, providing protection for the device, and allowing the material adsorbed by the adsorbent 13 to pass therethrough. Specific examples include polyethylene, polypropylene, polyester, nylon, and other plastics; nonwovens, wovens, knits, and nets composed of inorganic, metal, and other fibers; sponges and foams having open cells; porous polymer films fabricated from polypropylene, 4-methylpentene, polyvinylidene fluoride (PVDF), polytetrafluoroethylene (PTFE), and other materials having open micropores; paper; and ion-exchange resins, nylon, polypropylene, and other polymer membranes capable of selectively transmitting only certain gases. The above members may be used in combinations of two or more components.

Porous polymer films can be cited as the preferred examples of materials for the breathable member 14. Among these materials, porous polytetrafluoroethylene films should preferably be used because of their reduced dust and gas generation. The porous polytetrafluoroethylene films should have a thickness of 1–1000 μm, a porosity of 5–95%, and a pore diameter of 0.01–15 m, and preferably a thickness of 10–200 μm, a porosity of 60–90%, and a pore diameter of 0.1–5 μm. Such porous polytetrafluoroethylene films can be manufactured by stretching, solvent extraction, casting, or another conventionally known method. A porous expanded polytetrafluoroethylene film is particularly preferred because of its low pressure loss and high collection efficiency. Such porous polytetrafluoroethylene films can be manufactured by the conventionally known stretching methods disclosed in JP (Kokai) 46-7284 and 50-22881, in Domestic Re-publication of PCT International Publication 03-504876, and elsewhere.

A laminated sheet comprising a porous polymer film and a breathable support should preferably be used as the breathable member 14. No particular restrictions are imposed on the material for the breathable support as long as this material can remain breathable and can reinforce the porous polymer film. Specific examples include polyethylene, polypropylene, polyester, nylon, and other plastics; nonwovens, wovens, knits, and nets composed of inorganic, metal, and other fibers; and sponges and foams having open cells. Plastic nonwovens are particularly preferred because of their low cost and ease of lamination.

Any method can be used to laminate together the porous polymer film and breathable support as long as the lamination process does not impede breathability or gas permeability, and any conventionally known method can be appropriately used. Preferred examples commonly include methods in which the laminate is bonded under heat and pressure between a pair of heating rolls and pressure rolls; methods in which gravure rolls are used to perform lamination after an adhesive has been partially applied to the adhesion surface of a porous polymer film or breathable support; and methods in which lamination is performed after a hot-melt adhesive or other type of adhesive has been sprayed in a dotted, powdered, or fibrous pattern on the adhesion surface of a porous polymer film or breathable support.

According to another preferred embodiment, the breathable member 14 may constitute part of the adsorbent container unit 16, as shown in FIG. 3. The adsorbent container unit 16 is not limited in any particular way in terms of shape as long as the interior thereof can accommodate the adsorbent 13. The unit is commonly a substantially cubical or cylindrical formation in which at least part of the container bottom or the like is formed from a breathable member.

The container of the adsorbent container unit can be fabricated by the injection molding or cutting of polycarbonate, polypropylene, PVDF, or another resin, or by the pressing or cutting of stainless steel, aluminum, or another metal or alloy.

Heat fusion, high-frequency fusion, ultrasonic fusion, bonding with an adhesive, or another method can be appropriately used to bond together the breathable member 14 and adsorbent container unit 16. When the components are bonded using an adhesive, this adhesive is not subject to any particular limitations, and an epoxy-based adhesive, urethane-based adhesive, silicone-based adhesive, or other adhesive is commonly used.

The collar 15 can be bonded from the outside to the peripheral portion of the mounting hole 18 in the airtight container 17, and can have any shape suitable for such bonding, which is commonly a substantially circular, elliptical, rectangular, or other shape. The collar 15 should preferably be a separate component having certain strength.

The breathable member 14 and base 12 can be bonded together by the application of a bonding agent or an adhesive to the material surface of the base. The bonding agent used may be based on butyl rubber or epoxy, although an acrylic bonding agent is preferred from the standpoint of durability and cleanliness. An epoxy adhesive, urethane adhesive, silicone adhesive, or other commonly used adhesive may be used, and products such as hot-melt adhesives may also be used. The components may also be bonded using an adsorbent container, breathable member, or base composed of polypropylene, polyester, or another material meltable by heating. Heat fusion, high-frequency fusion, ultrasonic fusion, or the like may be performed.

The collar 15 and the peripheral portion of the mounting hole 18 in the airtight container 17 can be bonded together by any method capable of producing a hermetically sealed joint, and no particular restrictions are imposed. However, joining the components by adhesion or fusion is preferred for obtaining a reliably airtight joint. A failure to keep the joint airtight will allow particles, moisture, noxious gases, and other noxious substances to penetrate into the airtight container from the outside without passing through the gas adsorption filter. A bonding agent or an adhesive is used when a bonding technique is adopted. In this case, the bonding agent or adhesive is applied to the peripheral portion of the mounting hole 18 in the airtight container 17, and the collar 15 of the gas adsorption filter 11 is pressed and bonded thereto. It is also possible to adopt a reverse procedure in which the bonding agent or adhesive is applied to the surface of the collar 15 before the components are bonded together. A heat fusion technique (in which melting and bonding are performed using heat), a high-frequency fusion technique, an ultrasound fusion technique, a method in which a hot-melt resin is poured to bond the components together, or the like can be used when the airtight container 17 is made of polypropylene or another resin, or when resin is used as the material for the breathable member 14 or base 12. Bonding may also be performed by applying an adhesive tape or the like from the outside of the airtight container 17 such that all or part of the gas adsorption filter 11 is covered, or by interposing a packing, O-ring, or other type of rubber insert and using a pressure tool or the like to bond the components together under pressure.

One or more ventilation ports can be formed in the base 12 of the gas adsorption filter 11. In a completely sealed container, the pressure inside the airtight container varies greatly with variations in temperature and air pressure, and these pressure variations bring about phenomena in which the housing of the airtight container breaks as a result of deformation, cracking, or the like, or air seeps through a packing that possesses reduced sealing force. When they occur, such phenomena allow particles, moisture, noxious gases, and other noxious substances to penetrate together with air into the container from the outside and to have an adverse effect on the members and other components inside the container. Ports (ventilation ports) for forcibly admitting and discharging air are therefore provided, and these ventilation ports are integrated with the gas adsorption filter in order to reduce the internal pressure variations when a possibility exists that temperature or pressure will vary greatly and the aforementioned problems will arise. In this structure, any noxious substance contained in the air admitted through the ventilation ports from outside the airtight container will be removed by the adsorption filter when passing through the area occupied by the adsorption filter, and clean air alone will be admitted into the airtight container.

The external surfaces of the base 12 and airtight container in the gas adsorption filter 11 may also be covered by a cover sheet. Allowing the base 12 to become exposed outside the airtight container creates the danger that the gas adsorption filter will be damaged by external stress when certain handling methods are employed or when the airtight container is arranged in a certain way. In the case of a HDD, for example, an accident may occur in which the user may peel off the gas adsorption filter from the container out of curiosity when replacing the HDD. Using the cover sheet has the combined purpose of covering/protecting the base 12, allowing a display label to be affixed to the airtight container 17, preventing sound from escaping from the container, and the like. For example, a display label may be affixed to a HDD or the like in order to indicate the capacity, characteristics, specifications, or other properties thereof. It is also possible to attach an adhesive tape to a stainless steel plate and to affix the plate to the HDD cover in order to prevent sound from escaping to the outside from the HDD interior. Fixing the gas adsorption filter in place with the aid of a cover sheet that combines these functions constitutes another preferred embodiment.

The cover sheet may be provided with one or more ventilation ports. When the gas adsorption filter is also designed to perform a ventilation function, covering the entire surface with a cover sheet inhibits the flow of air. For this reason, the cover sheet must also be provided with an air distribution function. This function can be ensured by forming ventilation ports in the cover sheet or by providing the cover sheet with a concave cross section to form a channel and allowing air to distribute through this channel and reach the ventilation ports of the gas adsorption filter.

The cover sheet and the airtight container 17 can be bonded or otherwise combined together with the aid of a bonding agent or adhesive. The bonding agent used may be based on butyl rubber or epoxy, although an acrylic bonding agent is preferred from the standpoint of durability and cleanliness. An epoxy adhesive, urethane adhesive, silicone adhesive, or other commonly used adhesive may be used in an appropriate manner, and products such as hot-melt adhesives may also be used. The components may also be bonded using polypropylene, polyester, or another material meltable by heating, and the material may be fused by heat fusion, high-frequency fusion, ultrasonic fusion, or the like.

Grooved air channels may also be provided to the base 12 of the gas adsorption filter 11. If the gas adsorption filter is provided with a ventilation port, the outside humidity and the humidity in the container reach equilibrium and assume the same state over time. In this case, providing the ventilation port with a diffusion channel may be used to prevent the humidity in the airtight container from following the extreme humidity variations occurring outside. In the example of an HDD, the head for reading and writing information has low resistance to humidity, so the humidity in the HDD needs to be kept as constant as possible. In view of this, the grooved channels for passing air should preferably be formed such that outside moisture is prevented from rapidly entering the HDD when the outside moisture level suddenly increases. Moisture enters an HDD as a result of diffusion brought about by molecular motion, so the entry of moisture into the HDD can be delayed by extending the grooved air channels (increasing the distance the moisture has to travel) that connect the interior of the HDD to the outside.

The air channels can be formed by a method in which the base 12 is provided with concave patterns, and a cover sheet is affixed thereto to form channels, or a method in which the channels are formed by providing the adhesive layer of the cover sheet with convex or concave grooves and affixing this layer to the base 12 of the gas adsorption filter 11.

Grooved air channels may also be provided to the adsorbent 13 of the gas adsorption filter 11. These air channels act to increase the area of contact between the penetrating gas and the adsorbent and allow the penetrating gas to be adsorbed more fully when a corrosive gas penetrating from the outside comes into contact with the adsorbent. These air channels also allow the pressure loss (resistance) occurring during the passage of air through a gas adsorption filter to be reduced by causing the penetrating gas to flow through the channels.

An example in which a cover sheet with a bonding agent is provided with a ventilation port, and an air channel is formed in the bonding agent layer will now be described with reference to FIG. 5. FIG. 5(*a*) is a diagram of the cover sheet with the bonding agent as viewed from below, FIG. 5(*b*) is a side view of the cover sheet with the bonding agent, and FIG. 5(*c*) is a cover sheet depicting the manner in which a gas adsorption filter 11 having a cover sheet with a bonding agent is fixedly inserted into the mounting hole 18 of an airtight container 17. In the drawing, 21 is a cover sheet, which in this example is a circular stainless steel plate. 22 is a ventilation port, 23 is a bonding agent layer, and 24 is an air channel formed in the bonding agent layer 23. The ventilation port 22 is formed in the center of the circular stainless steel plate constituting the cover sheet 21, and the bonding agent layer 23 in which the air channel 24 is formed is provided thereto, as shown in the drawing. The bonding agent layer 23 may be positioned by the application of a bonding agent or the affixation of an adhesive tape. The base 12 is provided with a ventilation port 25 such that an exact match is achieved with the final portion of the air channel 24, and the gas adsorption filter 11 is fixedly mounted in the area adjacent to the mounting hole 18 of the airtight container 17 such that the two ventilation ports 22 and 25 are connected by the air channel 24. In this arrangement, the air entering through the cover sheet 21 travels along the route formed by the ventilation port 22 of the cover sheet 21, the air channel 24 of the bonding agent layer 23, and the ventilation port 25 of the base 12 in the order indicated, and enters the airtight container 17 after passing through the adsorbent 13 and breathable member 14, where noxious gas, moisture, particles, and other contaminants are removed. The air channel 24 is shown schematically in FIG. 5(a). The channel may assume a variety of configurations, and the width, depth, and other dimensions thereof may be set to appropriate levels.

Another configuration example of ventilation ports and air channels will now be described with reference to FIG. 6. FIG. 6(a) is a diagram of the base as viewed from above, FIG. 6(b) is a diagram of a cover sheet provided with a ventilation port as viewed from above, FIG. 6(c) is a side view of the gas adsorption filter 11, and FIG. 6(d) is a cross section depicting the manner in which the gas adsorption filter 11 is fixedly inserted into the mounting hole 18 of an airtight container 17. In the drawing, 31 is a base provided with an air channel 32, 33 is a ventilation port, and 34 is a cover sheet provided with a bonding agent and a ventilation port 35. The gas adsorption filter 11 is fixedly mounted in the airtight container 17 with the aid of the cover sheet 34. In this case, the base 31 may be fabricated by the injection molding of a resin such as polycarbonate to obtain a shape such as the one shown in the drawing, or by a method in which a polyester film or other film is punched out and laminated with a film in which holes shaped as channels are formed on one side. Noxious gases, moisture, particles, and other contaminants can thus be removed with high efficiency in the same manner as in the structure shown in FIG. 4. The air channel 32 is shown schematically in FIG. 6(a). The channel may assume a variety of configurations, and the width, depth, and other dimensions thereof may be set to appropriate levels.

Forming a release layer on the surface of the base in the gas adsorption filter constitutes yet another preferred embodiment. In the case of a HDD, each production item is inspected and, if found to be defective, is retrieved, reworked, and re-inspected, as described above. In the process, the cover is washed and reused. The gas adsorption filter is dismantled if it cannot withstand washing. The gas adsorption filter is discarded if it adheres strongly to the cover sheet and cannot be separated. Forming a release layer on the surface of the base allows the cover sheet and gas adsorption filter to be peeled off smoothly from each other, making it possible to eliminate the waste associated with discarded gas adsorption filters.

Silicone coating materials distributed by Dow Coming Toray Silicone, Shin-Etsu Chemical, and the like (such as SR2202, SH9550, and other products of Dow Toray) can be used as the release agents employed for the release layer described above. It is also possible to use fluorine-based release coating agents manufactured by DuPont. Commercially available sheets that have undergone release treatments may also be used. For example, it is possible to use polyester films, 4932, VCR803, and other products coated with release treatment agents manufactured by Sumitomo 3M.

The mounting structure for a gas adsorption filter pertaining to a second embodiment of the present invention will now be described.

FIG. 7 is a cross section schematically depicting a structural example of the gas adsorption filter (hereinafter occasionally abbreviated as "the present gas adsorption filter") used in a second embodiment of the present invention. At least part of the present gas adsorption filter 41 is composed of an adsorbent container unit 43 comprising a breathable sheet 42, and an adsorbent 44 is housed in the adsorbent container unit 43, as shown in FIG. 7. 46 is a ventilation port. Projections 45 are formed on part of the side surface of the adsorbent container unit 43, the portion of the adsorbent container unit 43 underneath these projections 45 is fitted into a mounting hole formed in an airtight container (not shown), and the projections 45 of the gas adsorption filter 41 are bonded by an adhesive tape, an adhesive agent, or the like to the periphery of the mounting hole on the outside of the airtight container.

The airtight container on which the present gas adsorption filter 41 is to be mounted may be the same airtight container or semi-sealed container as the one used in the first embodiment, and any description thereof will therefore be omitted to avoid redundancy.

The adsorbent container unit 43 of the present gas adsorption filter 41 may, for example, be fabricated by the injection molding or cutting of polycarbonate, polypropylene, polyvinylidene fluoride (PVDF), or another resin material; die casting of aluminum; press working of stainless steel; or the like. The adsorbent container unit 43 should preferably preserve its shape in a stable manner.

The same breathable member as the one used in the first embodiment can be used as the breathable sheet 42 disposed on the bottom of the adsorbent container unit 43, and a method identical to the above-described method for bonding a breathable member and a base can be used to bond the breathable sheet 42 with the main body of the adsorbent container unit 43.

No particular restrictions are imposed on the method for mounting the present gas adsorption filter 41 in the airtight container, and any method can be used as long as airtight mounting is achieved. The following methods may be used in addition to the bonding, melting, and other methods described with reference to the first embodiment: methods in which an external thread is formed at an appropriate location on the side surface of the main body of the adsorbent container, an internal thread is formed at an appropriate location in the airtight container unit to match the external thread, and the adsorbent filter is fixedly screwed into the airtight container; and methods in which threaded holes are formed in the projections 45, additional threaded holes are formed in the same manner at appropriate locations in the airtight container to match the first threaded holes, and the component is fixed in place with screws.

FIG. 8 is a cross section schematically depicting a structural example of the gas adsorption filter (hereinafter occasionally abbreviated as "the present gas adsorption filter") used in a third embodiment of the present invention. The present gas adsorption filter 51 is configured such that an adsorbent 56 is disposed on both sides of a base 52 (itself disposed on both sides of a bonding agent layer 53), the adsorbent 58 is covered with a breathable member 57, and adsorbent units are formed on both sides of the base 52, as shown in FIG. 8. 54 is a ventilation port, and 55 is a groove that is formed in the adsorbent 56 and constitutes an air channel.

The constituent materials and fabrication techniques adopted for the present gas adsorption filter 51 are the same as the materials and fabrication techniques used in the first embodiment, and their description will therefore be omitted.

Adopting a structure such as the one shown in FIG. 7 or 8 allows a large amount of adsorbent to be disposed near the port through which air enters the airtight container, and exceptional adsorptivity to be achieved. When a double airtight container is used for mounting, this type of structure is also beneficial for controlling the interior of an airtight container or adsorbing the gas in the space between the airtight container and the external container (cover case).

Products in which cover cases are mounted on HDDs as external storage devices are currently commercially available as external storage devices for mobile applications. The reason for this is that the HDD storage capacity has increased considerably, the prices have become affordable, and the devices have become sufficiently reliable to be safely carried around. For this reason, HDDs are expected to be widely used in the future as storage devices for mobile application in the same way as floppy disks have been used. However, such external HDDs are often used after being carried over long distances, and are thus subject to more stringent contamination protection requirements than do common HDDs. In view of this, the HDD cover cases should be provided with better airtightness, and gas adsorption filters should preferably be mounted between the HDDs and cover cases. Mounting a gas adsorption filter such as the one shown in FIG. 7 or 8 in a mounting hole formed in an HDD container will make it possible to adsorb noxious gases and other contaminants in the interior space of the HDD container as well as in the space between the HDD container and the cover case in such applications. Such a method allows the number of parts and the assembly costs to be reduced in comparison with situations in which gas adsorption filters are mounted separately inside the HDD container and in the space between the HDD container and the cover case.

The thickness of the gas adsorption filter should preferably be established in conjunction with the thickness of the exterior wall section of the airtight container and the depth of the recess formed in the exterior wall section of the airtight container by embossing or another method. In the example of an HDD container, the thickness of the exterior wall section at the stainless steel top cover is commonly about 500 $\mu$m to 2 mm, the depth of the embossed recess therein is about 1–3 mm, the thickness of the exterior wall section at the die-cast aluminum base is about 2–4 mm, and the depth of the recess therein is about 1–3 mm.

In the case of the gas adsorption filter 11 pertaining to the first embodiment, the thickness of the gas adsorption filter 11 should be 300 $\mu$m to 4 mm, preferably 400 $\mu$m to 2 mm, and ideally 500 $\mu$m to 1 mm. If the thickness is 4 mm or less, the gas adsorption filter 11 is thinner than the exterior wall section of the airtight container, so there are no filter parts that protrude into the airtight container, the volume occupied by the gas adsorption filter 11 inside the airtight container can be made substantially zero, and the benefits of the structure for mounting the gas adsorption filter 11 in accordance with the present invention can be maximized. A thickness less than 300 $\mu$m makes it more difficult to process the gas adsorption filter 11 and to adequately pack the adsorbent.

In the case of the gas adsorption filter 41 pertaining to the second embodiment, the thickness of the gas adsorption filter 41 should be 300 $\mu$m to 7 mm, preferably 400 $\mu$m to 5 mm, and ideally 500 $\mu$m to 4 mm. If the thickness is 7 mm or less, the thickness of the gas adsorption filter 41 is less than the thickness of the exterior wall section of the airtight container and the depth of the recess combined, so there are no filter parts that protrude into the airtight container or outside the container. A thickness less than 300 $\mu$m makes it more difficult to process the gas adsorption filter 41 and to adequately pack the adsorbent. The position in which the projections 45 are to be disposed should be appropriately established based on the depth of the recess and the thickness of the exterior wall section of the airtight container to prevent the gas adsorption filter 41 from protruding into the airtight container or outside the container. In the case of an HDD container fitted with a cover case, the space between the HDD container and the cover case can be used for mounting the gas adsorption filter 41, and a component that is thicker than the gas adsorption filter 41 can be used as long as this component can fit into this space.

In the case of the gas adsorption filter 51 pertaining to the third embodiment, the thickness of the gas adsorption filter 51 should be 300 $\mu$m to 7 mm, preferably 400 $\mu$m to 5 mm, and ideally 500 $\mu$m to 4 mm. If the thickness is 7 mm or less, the thickness of the gas adsorption filter 51 is less than the thickness of the exterior wall section of the airtight container and the depth of the recess combined, so there are no filter parts that protrude into the airtight container or outside the container. A thickness less than 300 $\mu$m makes it more difficult to process the gas adsorption filter 51 and to adequately pack the adsorbent. In the case of an HDD container fitted with a cover case, the space between the HDD container and the cover case can be used for mounting the gas adsorption filter 51, and a component that is thicker than the gas adsorption filter 51 can be used as long as this component can fit into this space.

EXAMPLES

The present invention will now be described in further detail through working examples.

Maximum gas adsorption filters that could fit into the space inside HDD containers capable of accommodating such gas adsorption filters were fabricated as working and comparative examples on the assumption that these filters would be incorporated into 2.5-inch HDDs and that the space (referred to herein below as an "allowable space") had a length of 10 mm, a width of 15 mm, a thickness of 0.8 mm, and a volume of 120 mm$^3$.

Example 1

An acrylic bonding agent sheet ATX902 (thickness: 25 $\mu$m; manufactured by Sumitomo 3M) was laminated to a release liner VCR803 (manufactured by Sumitomo 3M) obtained by subjecting one side of a polyester film with a thickness of 50 $\mu$m to a release treatment (the sheet was laminated to the side opposite from the side subjected to the release treatment), yielding a base with a thickness of 75 $\mu$m.

A porous polytetrafluoroethylene film (manufactured by Japan Gore-Tex) with a thickness of 50 $\mu$m, a porosity of 90%, and a mean pore diameter of 0.5 $\mu$m was used as a breathable member, and an adsorbent block comprising polytetrafluoroethylene resin and activated carbon with a length of 10 mm, a width of 15 mm, a thickness of 1.25 mm, and a volume of 187.5 mm$^3$ was mounted as an adsorbent, between the base (on the side of the bonding agent) and the breathable member, yielding a gas adsorption filter. The collar size was set to 1.5 mm. The adsorbent block had a packing density of 0.5 g/cc and a weight of 93.8 mg.

The adsorbent block was obtained by a process in which a product (prepared by dry-blending a polytetrafluoroethylene resin and pulverized coconut-shell activated carbon with a grain size of 50 μm in a prescribed ratio, adding naphtha as an extrusion aid, and aging the resulting material) was extruded into a paste-like film, the film was calendered with calendering rolls and formed into a sheet, the sheet product thus formed was dried for 20 minutes at 200° C. to remove the extrusion aid, and the dried product was cut to a prescribed shape.

The gas adsorption filter thus fabricated was fitted into a mounting hole that had a length of 10 mm, a width of 15 mm, and a case thickness of 0.5 mm and was formed in a 2.5-inch HDD case, and the hole was then covered with a cover sheet (thickness: 200 μm) composed of an adhesive tape on an aluminum foil backing, yielding the mounting structure for a gas adsorption filter in accordance with the present invention.

In this arrangement, it was possible to establish a case thickness of 0.5 mm in addition to the allowable space thickness of 0.8 mm (to a total thickness of 1.3 mm) for the space of the adsorbent unit. The thickness of the adsorbent block was 1.25 mm because the breathable member had a thickness of 0.05 mm.

Trimethylpentane (TMP) with a concentration of 50 μg/mL was fed as an organic gas through the mounting structure for a gas adsorption filter at a flow rate of 0.8 mL/min, and the amount of TMP adsorbed by the gas adsorption filter was measured and found to be 37.5 mg.

Comparative Example 1

The acrylic bonding agent sheet ATX902 (thickness: 25 μm; manufactured by Sumitomo 3M) was laminated on both sides of a polyester film with a thickness of 50 μm, yielding a base with a thickness of 100 μm.

The breathable member and adsorbent block were the same as those used in Working Example 1, and a gas adsorption filter was fabricated in the same manner as in Working Example 1. This comparative example uses the structure for mounting the gas adsorption filter on the inner wall of a HDD container with the bonding agent layer of a base in the same manner as in conventional practice, and the shape and size of the gas adsorption filter were selected such that the aforementioned structure was able to fit into the allowable space. As a result, the dimensions of the adsorbent block corresponded to a length of 7 mm, a width of 12 mm, a thickness of 0.75 mm, and a volume of 63 mm$^3$. The collar size was set to 1.5 mm. The adsorbent block had a packing density of 0.5 g/cc and a weight of 31.5 mg.

The gas adsorption filter thus fabricated was mounted with the aid of the bonding agent layer of the base on the inner case wall of a 2.5-inch HDD, yielding a conventional mounting structure for a gas adsorption filter.

The amount of TMP adsorbed by the gas adsorption filter in this mounting structure was measured in the same manner as in the working example, and was found to be 12.6 mg.

The aforementioned results demonstrate that the mounting structure for a gas adsorption filter in accordance with Working Example 1 of the present invention makes it possible to use an adsorbent in a volume that is about three times greater than the conventional mounting structure of Comparative Example 1, so the amount of gas that can be adsorbed and removed is also about three times greater, and a markedly improved adsorption performance.

As described in detail above, adopting the above-described arrangement for the present invention makes it possible to provide a mounting structure for a gas adsorption filter and a housing equipped with the gas adsorption filter in which any contradiction can be overcome between achieving a further reduction in the size of airtight containers such as casings for magnetic storage disk devices, and ensuring improved control over moisture, noxious gases, and other types of contaminants in the airtight containers.

The present invention also makes it possible to provide a mounting structure for a gas adsorption filter and a housing equipped with a gas adsorption filter in which the pressure loss can be kept at the same or lower level in comparison with a conventional gas adsorption filter, and the gas adsorption features can be kept at the same or higher level than in the past without requiring any modifications to the casing configuration of airtight containers or requiring any of the cost-enhancing plastic parts to be installed.

While particular embodiments of the present invention have been illustrated and described herein, the present invention should not be limited to such illustrations and descriptions. It should be apparent that changes and modifications may be incorporated and embodied as part of the present invention within the scope of the following claims.

What is claimed is:

1. A mounting structure for a gas adsorption filter to be mounted in an airtight container having a mounting hole formed by the process comprising:

providing a base having at least two sides;
   providing an adsorbent to at least one side of said base;
   covering the adsorbent with a breathable member comprising a porous polymer film to form an adsorbent unit;
   bonding together the breathable member and the peripheral portion of the base around the adsorbent to form a collar;
   fitting the adsorbent unit of the gas adsorption filter into the mounting hole formed in the airtight container; and
   bonding the collar of the gas adsorption filter to the peripheral portion of the mounting hole outside the airtight container;
   wherein the thickness of the filter including the base, adsorbent and film is about 400 μm to about 2 mm.

2. The mounting structure for a gas adsorption filter according to claim 1, wherein the breathable member comprises a laminated sheet comprising a porous polymer film and a breathable support.

3. The mounting structure for a gas adsorption filter according to claim 1, wherein the porous polymer film comprises porous polytetrafluoroethylene.

4. The mounting structure for a gas adsorption filter according to claim 2, wherein the porous polymer film comprises porous polytetrafluoroethylene.

5. The mounting structure for a gas adsorption filter according to claim 1, wherein one or more ventilation ports are formed in the base.

6. The mounting structure for a gas adsorption filter according to claim 1, wherein the collar is bonded to the peripheral portion of the mounting hole outside the airtight container.

7. The mounting structure for a gas adsorption filter according to claim 1, wherein the base and the external surface of the airtight container are covered with a cover sheet.

8. The mounting structure for a gas adsorption filter according to claim 7, wherein the cover sheet and the external surface of the airtight container are bonded together.

9. The mounting structure for a gas adsorption filter according to claim 7, wherein the external surface of the base is provided with a release layer.

10. The mounting structure for a gas adsorption filter according to claim 8, wherein the external surface of the base is provided with a release layer.

11. The mounting structure for a gas adsorption filter according to claim 7, wherein one or more ventilation ports are formed in the cover sheet.

12. The mounting structure for a gas adsorption filter according to claim 7, wherein the cover sheet is a display label.

13. The mounting structure for a gas adsorption filter according to claim 1, wherein the base is provided with grooved air channels.

14. The mounting structure for a gas adsorption filter according to claim 1, wherein the adsorbent is provided with grooved air channels.

15. A housing equipped with a gas adsorption filter formed by the steps comprising:
   providing a base having at least two sides;
   providing an adsorbent to at least one side of said base;
   covering the adsorbent with a breathable sheet to form an adsorbent unit;
   bonding together the breathable sheet and the peripheral portion of the base around the adsorbent to form a collar;
   fitting the adsorbent unit of the gas adsorption filter into the mounting hole formed in the airtight container; and
   bonding the collar of the gas adsorption filter to the peripheral portion of the mounting hole outside the airtight container
   such that the thickness of the filter including the base adsorbent and film is about 400 $\mu$m to about 2 mm.

16. A mounting structure for a gas adsorption filter to be mounted in an airtight container having a mounting hole formed by the process comprising:
   providing a base having at least two sides;
   providing an adsorbent to at least one side of said base;
   covering the adsorbent with a breathable member comprising a porous polymer film and the base such that the film covers the remaining sides of the adsorbent other than the at least one side contacting the base to form an adsorbent unit;
   bonding together the breathable member and the peripheral portion of the base around the adsorbent to form a collar;
   fitting the adsorbent unit of the gas adsorption filter into the mounting hole formed in the airtight container; and
   bonding the collar of the gas adsorption filter to the peripheral portion of the mounting hole outside the airtight container.

17. A housing equipped with a gas adsorption filter formed by the process comprising:
   providing a base having at least two sides;
   providing an adsorbent to at least one side of said base;
   covering the adsorbent with a breathable sheet comprising porous polymer film and the base such that the film covers the remaining sides of the adsorbent other than the at least one side contacting the base to form an adsorbent unit;
   bonding together the breathable sheet and the peripheral portion of the base around the adsorbent to form a collar;
   fitting the adsorbent unit of the gas adsorption filter into the mounting hold formed in the airtight container; and
   bonding the collar of the gas adsorption filter to the peripheral portion of the mounting hole outside the airtight container.

* * * * *